United States Patent
Koh et al.

(10) Patent No.: US 8,785,021 B2
(45) Date of Patent: Jul. 22, 2014

(54) BATTERY PACK

(75) Inventors: Seok Koh, Suwon-si (KR); Kyung-Ho Park, Suwon-si (KR); Jeong-Deok Byun, Suwon-si (KR); Eun-Ok Kwak, Suwon-si (KR)

(73) Assignee: Samsung SDI Co., Ltd (KR)

( * ) Notice: Subject to any disclaimer, the term of this patent is extended or adjusted under 35 U.S.C. 154(b) by 1369 days.

(21) Appl. No.: 12/247,556

(22) Filed: Oct. 8, 2008

(65) Prior Publication Data

US 2009/0092896 A1 Apr. 9, 2009

(30) Foreign Application Priority Data

Oct. 9, 2007 (KR) .................. 10-2007-0101542

(51) Int. Cl.
*H01M 2/10* (2006.01)
(52) U.S. Cl.
USPC ............................................. 429/96; 429/100
(58) Field of Classification Search
USPC ............................................................ 429/96
See application file for complete search history.

(56) References Cited

U.S. PATENT DOCUMENTS

| | | | |
|---|---|---|---|
| 6,524,732 | B1 | 2/2003 | Iwaizono et al. |
| 7,309,253 | B2 | 12/2007 | Ge et al. |
| 7,479,758 | B2 | 1/2009 | Moon |

FOREIGN PATENT DOCUMENTS

| | | | |
|---|---|---|---|
| CN | 2757341 | Y | 11/2004 |
| CN | 101048890 | A | 11/2005 |
| EP | 1753054 | A2 | 2/2007 |
| JP | 3221870 | | 8/2001 |
| JP | 2002-134080 | | 5/2002 |
| JP | 2004-214181 | | 7/2004 |
| JP | 2006-4882 | | 1/2006 |
| JP | 2006-147193 | | 6/2006 |
| JP | 2007-157452 | * | 6/2007 |
| KR | 10-614278 | B1 | 8/2006 |
| KR | 1020060012413 | * | 8/2006 |
| KR | 2007-8256 | A | 1/2007 |
| KR | 2007-22540 | A | 2/2007 |
| KR | 10-835743 | B1 | 5/2008 |

OTHER PUBLICATIONS

Abstract of Patent No. 2001-196048 published Jul. 19, 2001.
Notice of Allowability issued in Korean Patent Application No. 2007-101542 on Aug. 29, 2008.
Chinese Patent Registration Gazette No. 101409333B published Mar. 28, 2012.

* cited by examiner

*Primary Examiner* — Ula C Ruddock
*Assistant Examiner* — Jacob Marks
(74) *Attorney, Agent, or Firm* — Knobbe Martens Olson & Bear LLP (57) ABSTRACT

A battery pack including: a bare cell having first and second electrode terminals; a holder positioned on a first side of the bare cell, comprising first fastening portions; a protective circuit assembly seated in the holder; and a cover to cover the protective circuit assembly and the bare cell, the cover including second fastening portions. In the battery pack, the first and second fastening portions are interlocked inside of the cover.

26 Claims, 8 Drawing Sheets

BATTERY PACK

CROSS-REFERENCE TO RELATED APPLICATION

This application claims the benefit of Korean Patent Application No. 2007-101542, filed Oct. 9, 2007, in the Korean Intellectual Property Office, the disclosure of which is hereby incorporated herein by reference in its entirety.

BACKGROUND OF THE INVENTION

1. Field of the Invention

Aspects of the present invention relate to a battery pack, and more particularly, to a battery pack capable of preventing a defective appearance and label lifting.

2. Description of the Related Art

Rechargeable secondary batteries are more economical than disposable dry cells. In recent years, low-volume and high-capacity secondary batteries have been developed, which are widely used as power supplies for portable electronic devices, such as cellular phones, camcorders, notebook computers, and the like. Secondary batteries include nickel-cadmium batteries, nickel-metal hydride batteries, nickel-zinc batteries, and lithium secondary batteries.

Lithium secondary batteries are widely used, because of their small size, high capacity, high operating voltage, and high energy density per weight. Lithium secondary batteries may be classified as can-type lithium secondary batteries or pouch-type lithium secondary batteries, depending on the shape of a casing, which accommodates an electrode assembly having a negative electrode plate, a positive electrode plate, and a separator. The can-type lithium secondary batteries may be further classified as cylinder-type lithium secondary batteries or prismatic-type lithium secondary batteries.

The casing of the can-type lithium secondary batteries is generally formed of a metal, such as aluminum, and has a cylindrical shape, a prismatic shape, or a pillar shape with rounded edges. The can has an upper opening through which an electrode assembly is inserted and an electrolyte is injected. A cap assembly is used to seal the opening of the can, resulting in a sealed bare cell.

The pouch-type lithium secondary batteries have a pouch casing that accommodates an electrode assembly, on a lower surface of the casing. The lower surface is covered with an upper surface of the pouch casing, and sealing portions are formed by bonding edges of the upper and lower surfaces, resulting in a bare cell.

The bare cell is electrically connected with a protecting circuit board, which includes a protecting device to prevent overcharges, over-discharges, over-currents, and the like. In general, the electrical connection between the bare cell and the protecting circuit board is made via a lead. Such a secondary battery may be called a core pack.

A hard-pack-type battery pack is formed by inserting the core pack into an additional external case. An inner-pack-type battery pack is formed by filling a space between the bare cell and the protective circuit board with a resin, then labeling the core pack with a thin label. The core pack may include a holder, in which the protective circuit board can be seated.

In order to protect the protective circuit board from the outside, a case can be used to cover the protective circuit board. The appearance of a battery pack is formed by forming a protrusion that extends from an out surface of the holder and forming a hole in the case that corresponds to the protrusion. The protrusion is then inserted into the hole. As the protrusion extends outside from the holder, a defective appearance and label lifting can occur when attaching a label.

SUMMARY OF THE INVENTION

Aspects of the present invention provide a battery pack, which includes: a bare cell having first and second electrode terminals; a holder positioned on one side of the bare cell, including protrusions; a protective circuit assembly seated in the holder; and a cover formed to cover the protective circuit assembly and the bare cell, having holes joined to the protrusions. The protrusions and the holes are joined together, inside of the cover.

Aspects of the present invention provide a battery pack, which includes: a bare cell having first and second electrode terminals; a holder positioned on one side of the bare cell, having insertion holes; a protective circuit assembly seated in the holder; and a cover to cover the protective circuit assembly and the bare cell, having insertion protrusions joined to the insertion holes. The insertion holes and the insertion protrusions are joined together, inside of the cover.

According to aspects of the present invention, the battery pack may further include an insulating member interposed between the bare cell and the holder.

According to aspects of the present invention, the insulating member may include a side portion to cover a first side of the bare cell, an upper portion formed to cover a second side of the bare cell, and a lower portion formed to cover a third side of the bare cell.

According to aspects of the present invention, the holder may include a seating portion contacting the first side of the bare cell, support portions the extend perpendicularly from edges of the seating portion. A receiving portion is defined by the seating portion and the support portions.

According to aspects of the present invention, the cover may include a side cover to cover the first side of the bare cell, an upper cover to cover the second side of the bare cell, and a lower cover to cover the third side of the bare cell.

According to an aspect of the present invention, first and second fastening portions are respectively formed at a holder and a cover, and the first and second fastening portions are joined together inside of the cover, thereby preventing a defective appearance and label lifting, when attaching a label.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures. As referred to herein, when a first element is said to be disposed "on", or adjacent to, a second element, the first element can directly contact the second element, or can be separated from the second element by one or more other elements can be located therebetween. In contrast, when an element is referred to as being disposed "directly on" another element, there are no intervening elements present. As used herein, the term "and/or" includes any and all combinations of one or more of the associated listed items.

Figure 1:
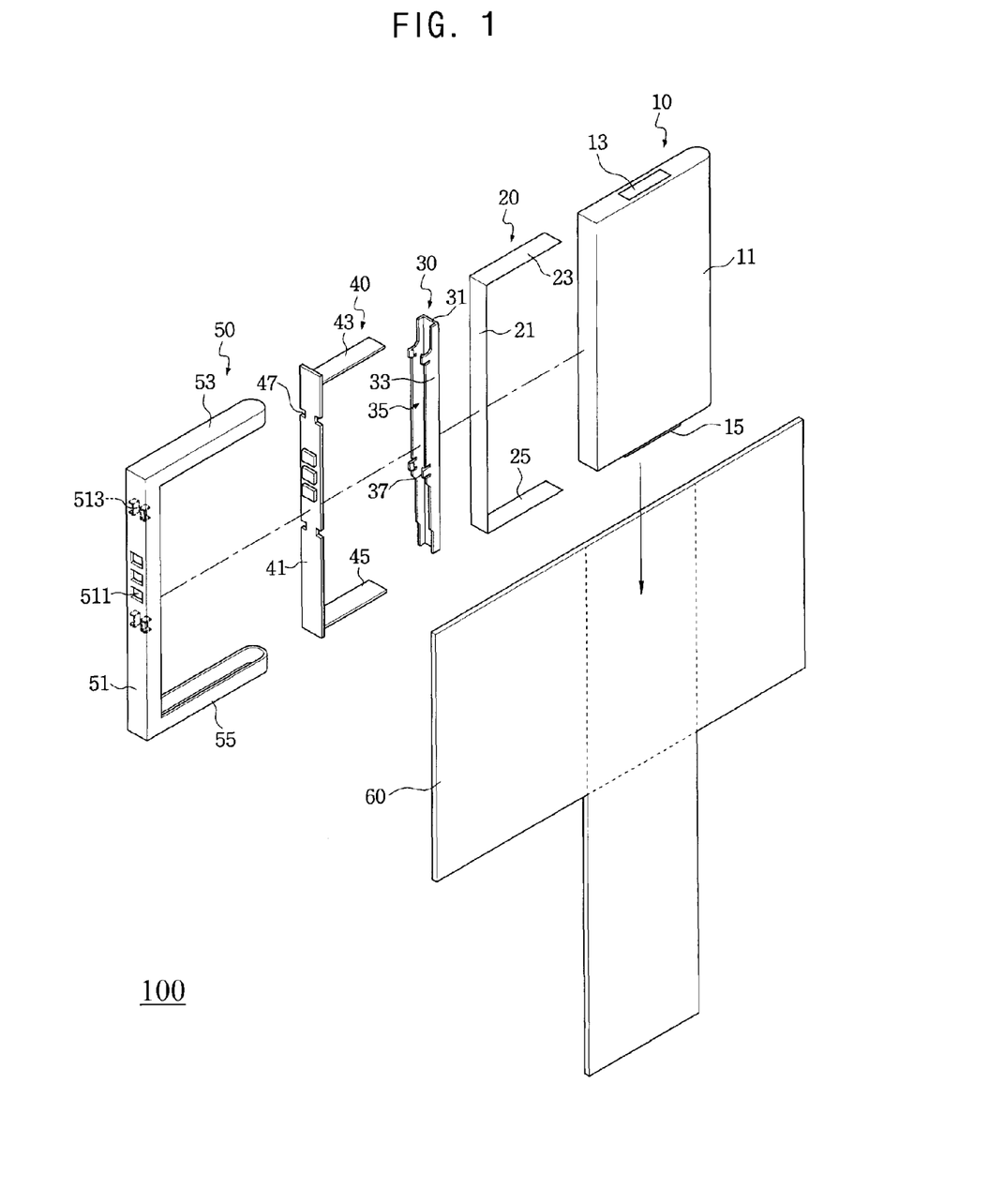
FIG. 1 is an exploded perspective view of battery pack, according to an exemplary embodiment of the present invention.
Figure 2A:
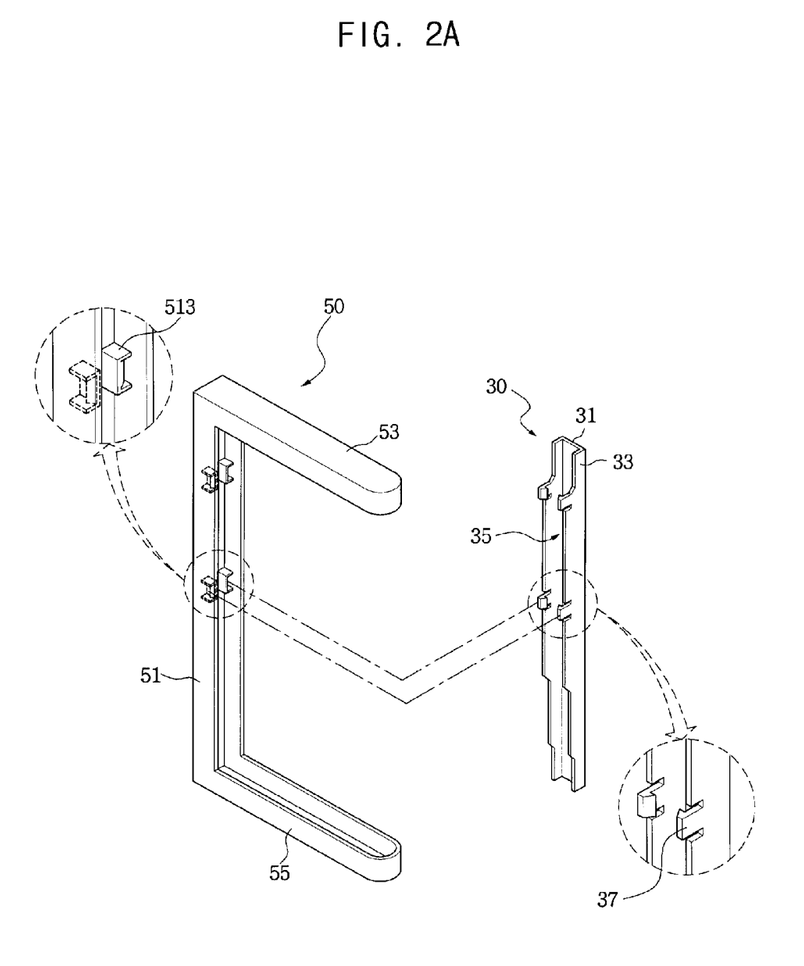
FIG. 2A is a perspective view of a holder and a cover of FIG. 1, before the holder is joined to the cover.
Figure 2B:
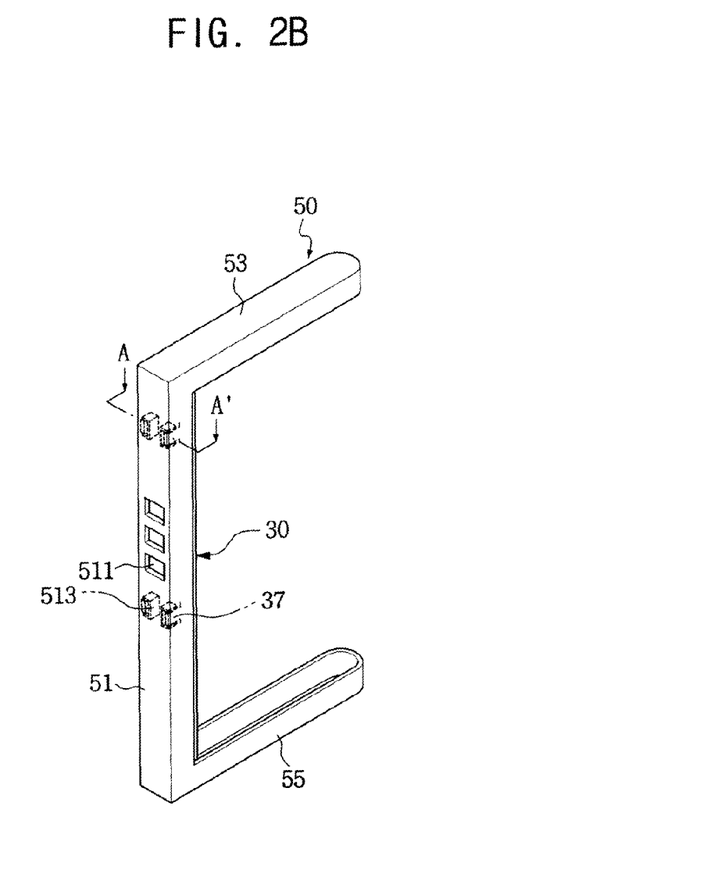
FIG. 2B is a perspective view of the holder and cover of FIG. 2A, after the holder is joined to the cover.
Figure 2C:
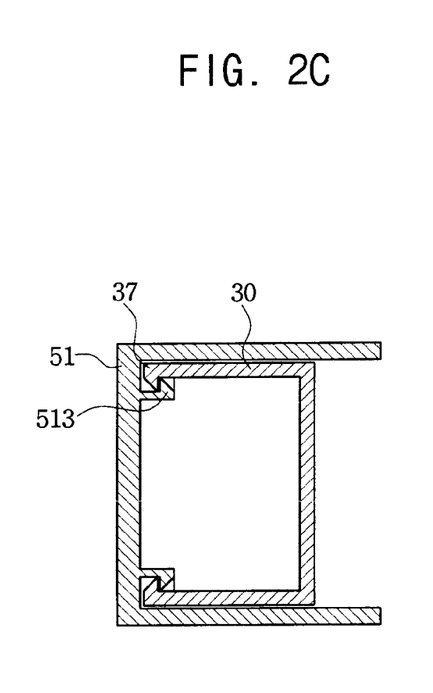
FIG. 2C is a cross-sectional view taken along line A-A' of FIG. 2B.

FIG. 1 is an exploded perspective view of a battery pack, according to an exemplary embodiment of the present invention. FIG. 2A is a perspective view of a holder and a cover of FIG. 1, before the holder is joined to the cover, FIG. 2B is a perspective view of the holder and cover in FIG. 2A, after the holder is joined to the cover, and FIG. 2C is a cross-sectional view taken along line A-A' in FIG. 2B.

Referring to FIG. 1, a battery pack 100, according to an exemplary embodiment of the present invention, includes a bare cell 10, a holder 30, a protective circuit assembly 40, and a cover 50. The battery pack 100 can further include an insulating member 20 disposed between the bare cell 10 and the holder 30. The battery pack 100 includes a label 60 to cover the bare cell 10, the holder 30, the protective circuit assembly 40, and the cover 50.

The bare cell 10 includes a can 11 and a cap assembly joined to an opening of the can 11. The bare cell 10 is formed by receiving an electrode assembly and an electrolyte inside the can 11. The electrode assembly is formed by winding, into a jelly-roll shape, two electrode plates and a separator interposed between the two electrodes. The separator prevents a short of the two electrodes.

The can 11 may be formed of iron (stainless steel), aluminum, or the like, using a deep drawing method. The can 11 can have a cylindrical shape, a prismatic shape, a column shape with curved corners, or the like.

A first electrode terminal (negative electrode terminal) 13 is formed on an upper surface of the bare cell 10, and a second electrode terminal (positive electrode terminal) 15 is formed on an opposing lower surface of the bare cell 10. According to some embodiments, the polarities of the electrode terminals 13 and 15 may be reversed. In some cases, the can 11 may be used as an electrode terminal. The can 11 may have an electrode plate formed on one surface thereof, such that the electrode plate serves as an electrode terminal. The polarities of the can 11 and/or the electrode plate may also be positive or negative, according to particular applications.

The electrode plate 15 may have a clad metal structure formed of aluminum and nickel layers. The aluminum layer is welded to the lower surface of the bare cell 10. The welding may be performed by ultrasonic welding, for example. The nickel layer is connected to a second lead terminal 45 of the protective circuit assembly 40.

The insulating member 20 may be positioned between the bare cell 10 and the holder 30, or between the bare cell 10 and the first or second lead terminals 43 or 45. The insulating member 20 can be a double coated adhesive tape to insulate and adhere the bare cell 10 and the holder 30.

The insulating member 20 can include a side portion 21 formed to cover a side surface of the bare cell 10, and upper and lower portions 23 and 25 respectively extending to cover the upper and lower surfaces of the bare cell 10. The side portion 21 adheres the side surface of the bare cell 10 to the holder 30. The upper portion 23 may cover the entire upper surface of the bare cell 10, or may cover only a portion of the upper surface of the bare cell 10, which extends between the negative electrode terminal 13 and the side surface of the bare cell 10.

The insulating member 20 prevents the first lead terminal 43 from being easily separated from the bare cell 10. However, when a washer or the like is formed on the upper surface of the bare cell 10, to insulate the first lead terminal 43 from the can 11, the upper portion 23 may be omitted.

The lower portion 25 may cover a portion of the lower surface of the bare cell 10, between the second lead terminal 45 and the side surface of the bare cell 10. The lower portion 25, in some embodiments, may cover the entire lower surface of the bare cell 10. However, when the second lead terminal 45 is positioned close to a lower edge portion of the can 11, the lower portion 25 may be omitted.

The holder 30 is positioned on the side surface of the bare cell 10. The insulating member 20 adheres the bare cell 10 to the holder 30. The protective circuit assembly 40 can be seated in the holder 30. The holder 30 may be formed of a plastic material. The holder 30 can include a seating portion 31 that contacts the side surface of the bare cell 10, and support portions 33 that extend perpendicularly from edges of the seating portion 31, thereby forming a receiving portion 35 to receive the protective circuit assembly 40. The holder 30 includes a plurality of first fastening portions 37. The first fastening portions 37 are joined to second fastening portions 513 of the cover 50, which will be described later.

Referring to FIGS. 2A through 2C, the first fastening portions 37 extend from the support portions 33. The first fastening portions 37 have wedge-shaped portions that interlock with the second fastening portions 513. Since the first fastening portions 37 are joined to the second fastening portions 513, inside the cover 50, it is possible to prevent a defective appearance, due to external protrusions.

It will be apparent that the shapes and/or positions of the first fastening portions 37 are not limited to those described in this exemplary embodiment. For example, the first fastening portions 37 may protrude from the seating portion 31 (between the support portions 33), or may protrude from ends of the seating portion 31.

The protective circuit assembly 40 includes a protective circuit board 41 on which electric elements, such as a positive temperature coefficient (PTC) thermistor, a protective circuit, and external connection terminals are mounted. The protective circuit assembly 40 includes first and second lead terminals 43 and 45. When the internal temperature of a battery increases beyond a set level, or the voltage of the battery increases beyond a set level, due to an over-charge, or the like, the protective circuit interrupts current flow in the battery, thereby preventing the battery from burning or exploding.

The protective circuit assembly 40 may include a sensor resistor, a charge/discharge FET element, a fuse, a controller, a temperature fuse, and the like. The electrical resistance of the PTC thermistor increases when the temperature of a battery is beyond a set value. Thus, when a battery has a high temperature, the PTC thermistor stops current flow. Since the operations of the PTC thermistor are reversible, the resistance of the PTC thermistor decreases when the temperature of a battery is lowered, so the current flow in the battery can resume.

The external connection terminal is a connection point for external devices. The external connection terminal may include a data input/output terminal, a power source terminal, a ground terminal, and the like. When a battery is connected to an external device through the external connection terminal, a discharge operation can occur. When a battery is connected to a charger through the external connection terminal, a charge operation can occur.

The protective circuit board 41 is positioned between the holder 30 and the cover 50. Grooves 47 are formed in edges of the protective circuit board 41, corresponding to the first and second fastening portions 37 and 513, such that the first fastening portions 37 are easily joined to the second fastening portions 513, inside of the cover 50. The grooves 47 may guide the connection of the first and second fastening portions 37 and 513. The grooves 47 may not be formed, depending on the positions of the first fastening portions 37 and the second fastening portions 513. Holes may be formed in place of the grooves 47.

The first and second lead terminals 43 and 45 connect the protective circuit board 41 to the negative and positive electrode terminals 13 and 15. The first lead terminal 43 is connected to the negative electrode terminal 13, and the second lead terminal 45 is connected to the electrode plate 15.

When the can 11 serves as an electrode terminal (the electrode plate 15 is not included), the second lead terminal 45 can be connected to the can 11. The upper portion 23 of the insulating member 20, or a washer, is interposed between the first lead terminal 43 and the upper surface of the bare cell 10, to insulate them from each other. When the insulating member 20 is adhesive, the first lead terminal 43 is adhered to the bare cell 10, so as to be connected to the negative electrode terminal 13. In addition, the lower portion 25 of the insulating member 20 is interposed between the second lead terminal 45 and the lower surface of the bare cell 10, so that the second lead terminal 45 is adhered to the bare cell 10, so as to be connected to the positive electrode terminal 15.

The cover 50 includes a side cover 51, an upper cover 53, and a lower cover 55. The side cover 51 covers the side surface of the bare cell 10, to which the protective circuit board 41 and the holder 30 are adhered. Terminal holes 511 are formed in the cover, at positions corresponding to the external connection terminals of the protective circuit assembly 40, such that the external connection terminals are exposed there through. The second fastening portions 513 are formed inside the side cover 51 and are joined to the first fastening portions 37, so that the holder 30 and the cover 50 are joined together.

Referring to FIGS. 2A through 2C, the second fastening portions 513 define openings into which the first fastening portions 37 can be inserted. Each second fastening portion 513 has a wedge-shaped portion that interlocks with the wedge-shaped portion of the first fastening portion 37. Therefore, the second fastening portion 513 interlocks with the first fastening portion 37. Since the second fastening portions 513 are joined to the first fastening portions 37, inside the side cover 51, it is possible to prevent a defective appearance, due to external protrusions.

It will be apparent that the shape and position of the second fastening portions 513 is not limited to those described herein. It will be readily understood by those skilled in the art that various modifications and changes can be made, such that the first and second fastening portions 37 and 513 can be joined together inside of the side cover 51.

The upper and lower covers 53 and 55 cover the upper and lower surfaces of the bare cell 10, respectively. Although the second fastening portion 513 is shown to be formed inside of the side cover 51, the second fastening portion 513 may alternatively be formed in other regions of the cover 50, depending on the shape of the holder 30 and the cover 50.

The cover 50 may be formed by integrally forming the side, upper, and lower covers 51, 53, and 55 using a material such as plastic, or the like. The bare cell 10 and the protective circuit assembly 40 can be joined to the cover 50 using a shrink-fit method. Alternatively, the cover 50 may be formed, by individually forming the side, upper, and lower covers 51, 53, and 55, and then joining the same together.

Alternatively, the cover 50 may be formed by attaching the side, upper, and lower covers 51, 53, and 55 to the side, upper, and lower surfaces of the bare cell 10, and then injecting a hot melting resin between the side cover 51 and the bare cell 10, so that the cover 50 is joined to the bare cell 10.

After the cover 50 is attached to the bare cell 10, the label 60 may be attached to the outside of the bare cell 10 and the cover 50. The label 60 can be an adhesive label, or may be a shrink-wrap type film.

Figure 3:
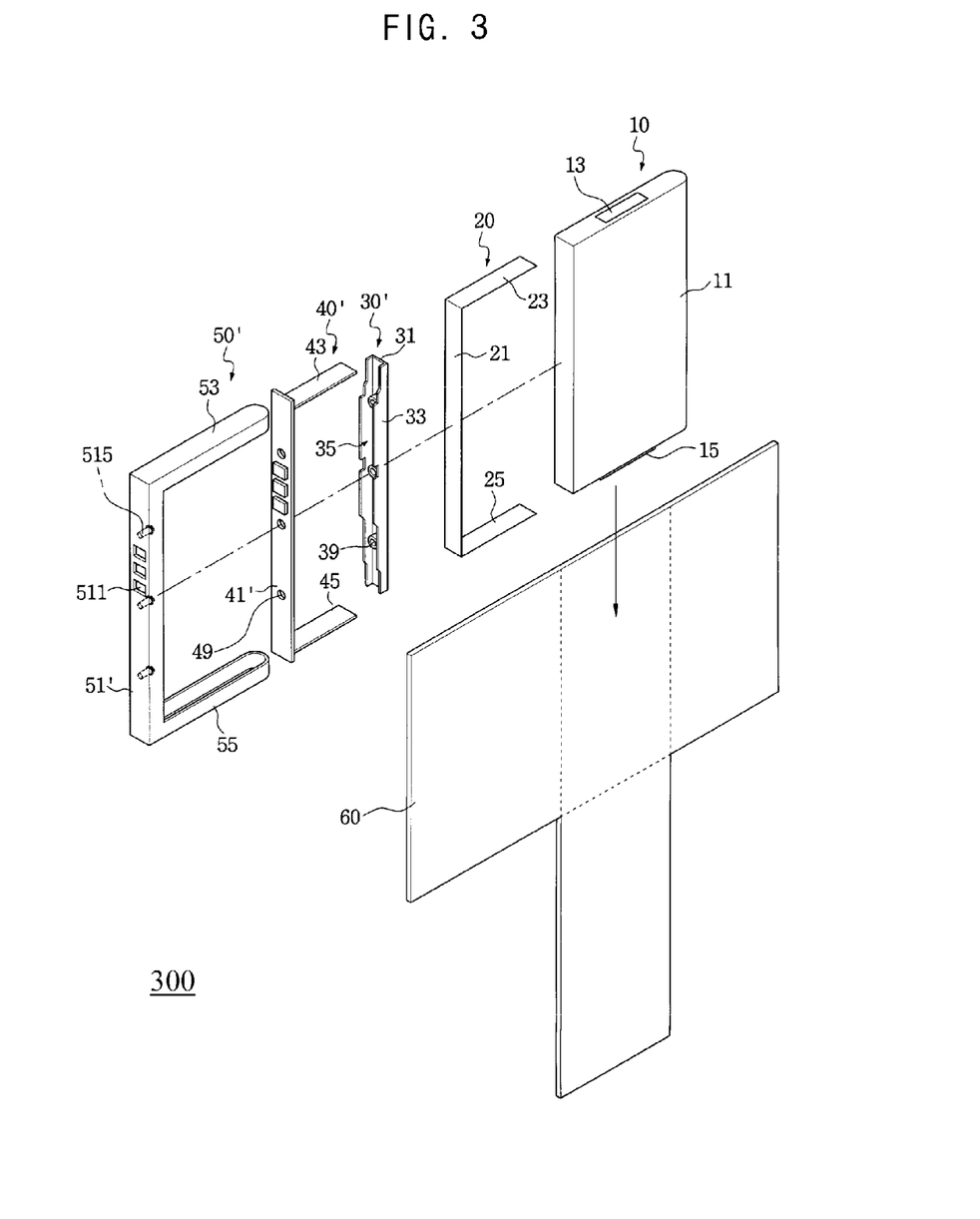
FIG. 3 is an exploded perspective view of battery pack according to an embodiment of the present invention.
Figure 4A:
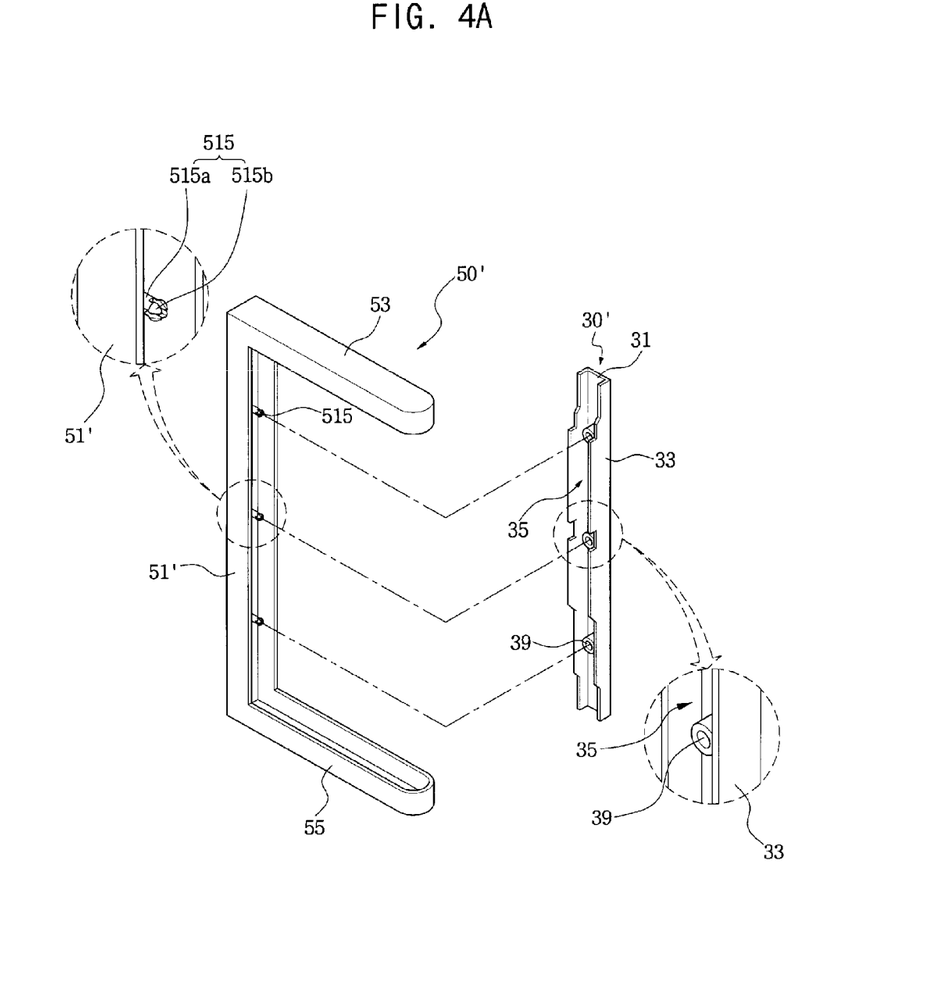
FIG. 4A is a perspective view of a holder and a cover of FIG. 3, before the holder is joined to the cover.
Figure 4B:
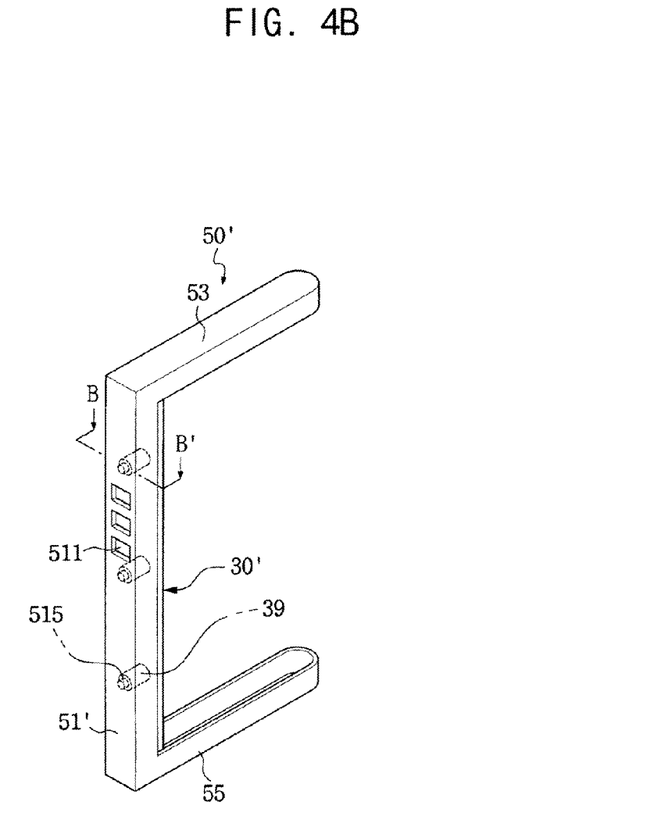
FIG. 4B is a perspective view of the holder and cover of FIG. 4A, after the holder is joined to the cover.
Figure 4C:
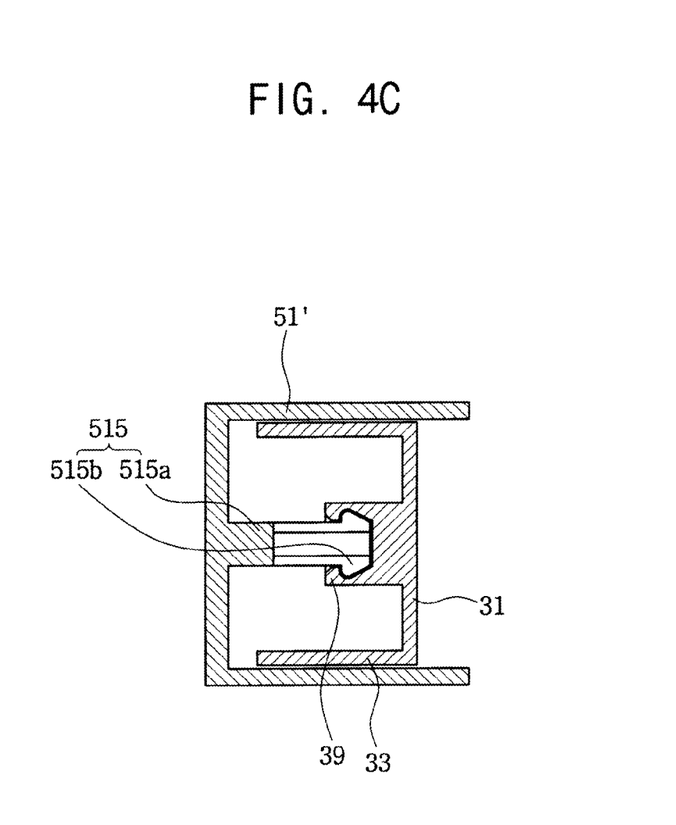
FIG. 4C is a cross-sectional view taken along line B-B' of FIG. 4B.

FIG. 3 is an exploded perspective view of a battery pack 300, according to an exemplary embodiment of the present invention. FIG. 4A is a perspective view of a holder and a cover of FIG. 3, before the holder is joined to the cover. FIG. 4B is a perspective view of the holder joined to the cover 50', and FIG. 4C is a cross-sectional view taken along line B-B' of FIG. 4B.

Referring to FIG. 3, the battery pack 300 includes a bare cell 10, a holder 30', a protective circuit assembly 40', and a cover 50'. The battery pack can further include an insulating member 20 disposed between the bare cell 10 and the holder 30'.

After joining the bare cell 10, the holder 30', the protective circuit assembly 40', and the cover 50' a label 60 can be attached to the battery pack 300. Since the bare cell 10, the insulating member 20, and the label 60 are similar to those of the battery pack 100, a detailed description thereof, is omitted.

The holder 30' can include a seating portion 31 contacting a side surface of the bare cell 10 and support portions 33 extending perpendicularly from edges of the seating portion 31, thereby forming a receiving portion 35 to receive the protective circuit assembly 40'. The holder 30' includes a plurality of first fastening portions 39. The first fastening portions 39 are joined to second fastening portion 515 of the cover 50', which will be described later.

Referring to FIGS. 4A through 4C, the first fastening portions 39 are formed on a surface of the seating portion 31, between both support portions 33. The first fastening portions 39 protrude from the seating portion 31. The fastening portions 39 are cylindrical tubes.

The first fastening portions 39 have narrowed openings that are smaller than the second fastening portions 515. The openings have inclined surfaces, so that the second fastening portions 515 can be easily inserted into the first fastening portions 39. An inner diameter of the first fastening portions 39 is larger than a diameter of the first fastening portion 39. The first fastening portions 39 interlock with the second fastening portions 515.

The second fastening portions 515 are joined to the first fastening portions 39, inside of the cover 510, such that they do not affect the external appearance of the battery pack 300. The shape and position of the first fastening portions 39 can be altered, so long as the first and second fastening portions 39 and 515 interlock within the cover 50'.

The protective circuit assembly 40' includes a protective circuit, a protective circuit board 41' on which electric elements, such as PTC thermistor, and external connection terminals are mounted, and first and second lead terminals 43 and 45. The protective circuit, the first lead terminal 43, and the second lead terminal 45 are similar to those of the battery pack 100, so a detailed description thereof is omitted.

The protective circuit board 41' includes holes 49 formed at positions corresponding to the first and second fastening portions 39 and 515. The first and second fastening portions 39 and 515 are joined together through the holes 49. The holes 49 may not be formed, depending on the positions of the first fastening portions 39 and the second fastening portions 515. Grooves may be formed in place of the holes 49.

The cover 50' includes a side cover 51', an upper cover 53, and a lower cover 55. The second fastening portions 515 are formed inside the side cover 51', so as to be joined to the first fastening portions 39, and thereby connect the holder 30' and the cover 50'.

Referring to FIGS. 4A through 4C, the second fastening portion 515 includes a body portion 515a and a head portion 515b. The head portion 515b is larger than the body portion 515a. The body portion 515a may be cylindrical, polygonal, or the like.

The head portion 515b has a "+"-shaped center cut. The head portion 515b is constricted when it is inserted into the opening of the first fastening portion 39, and then returns to its original shape, after it is completely inserted in to the first fastening portion 39. The second fastening portion 515 is thereby secured in the first fastening portion 39. Since the first and second fastening portions 39 and 515 are joined inside of the side cover 51', it is possible to maintain the appearance of the battery pack 300. It will be readily understood by those skilled in the art that various modifications and changes can be made to the shape of the second fastening portion 515, such that the first and second fastening portions 39 and 515 can be joined together inside the side cover 51'.

Although a few exemplary embodiments of the present invention have been shown and described, it would be appreciated by those skilled in the art that changes may be made in theses exemplary embodiments, without departing from the principles and spirit of the invention, the scope of which is defined in the claims and their equivalents.

What is claimed is:

1. A battery pack comprising:
a bare cell comprising:
a first side, a second side, and a third side, wherein the second side and the third side face away from one another, the first side being interposed between and interconnecting the second side and the third side,
a first electrode terminal on the second side, and
a second electrode terminal on the third side;
a holder disposed over the first side of the bare cell, the holder comprising first fastening portions;
a protective circuit assembly seated in the holder; and
a cover comprising a first portion, a second portion, and a third portion, wherein the first portion is interposed between and interconnecting the second portion and the third portion, wherein at least part of the protective circuit assembly is interposed between the holder and the first portion of the cover,
wherein the first portion covers the first side of the bare cell, the holder and the protective circuit assembly,
wherein the second portion at least partially covers the second side of the bare cell, wherein the third portion at least partially covers the third side of the bare cell, and
wherein the first portion further comprises second fastening portions on an inner side thereof, wherein the first fastening portions of the holder engage with the second fastening portions of the first portion.

2. The battery pack according to claim 1, further comprising an insulating member interposed between the bare cell and the holder, wherein the insulating member comprises:
a side portion disposed on the first side of the bare cell;
an upper portion disposed on the second side of the bare cell; and
a lower portion disposed on the third side of the bare cell.

3. The battery pack according to claim 2, wherein the insulating member is a double-coated adhesive tape.

4. The battery pack according to claim 2, the holder is attached to the first side of the bare cell, by the side portion of the insulating member.

5. The battery pack according to claim 1, wherein the holder comprises:
a seating portion disposed on the first side of the bare cell; and
support portions that extend perpendicularly from the seating portion,
wherein the seating portion and the support portions define a receiving portion to receive the protective circuit assembly.

6. The battery pack according to claim 1, wherein the protective circuit assembly comprises:
a protective circuit board comprising electric elements and external connection terminals;
a first lead terminal connected to the first electrode terminal; and
a second lead terminal connected to the second electrode terminal.

7. A battery pack, comprising:
a bare cell comprising:
a first side, a second side, and a third side, wherein the second side and the third side face away from one another, the first side being interposed between and interconnecting the second side and the third side,
a first electrode terminal on the second side, and
a second electrode terminal on the third side;
a holder disposed over the first side of the bare cell, the holder comprising protrusions;
a protective circuit assembly seated in the holder; and
a cover comprising a first portion, a second portion, and a third portion, wherein the first portion is interposed between and interconnecting the second portion and the third portion, wherein at least part of the protective circuit assembly is interposed between the holder and the first portion of the cover,
wherein the first portion covers the first side of the bare cell, the holder and the protective circuit assembly,
wherein the second portion at least partially covers the second side of the bare cell, wherein the third portion at least partially covers the third side of the bare cell, and
wherein the first portion further comprises insertion holes on an inner surface thereof, wherein the protrusions of the holder engage with the insertion holes of the first portion.

8. The battery pack according to claim 7, further comprising an insulating member interposed between the bare cell and the holder, wherein the insulating member comprises:
a side portion to cover the first side of the bare cell;

an upper portion to cover the second side of the bare cell; and a lower portion to cover the third side of the bare cell.

9. The battery pack according to claim 8, wherein the holder is attached to the first side of the bare cell, by the side portion of the insulating member.

10. The battery pack according to claim 7, wherein the holder comprises:
a seating portion disposed on the first side of the bare cell;
support portions that extend perpendicularly from the seating portion,
wherein the seating portion and the support portions define a receiving portion to receive the protective circuit assembly.

11. The battery pack according to claim 10, wherein the protrusions extend from of the support portions.

12. The battery pack according to claim 11, wherein the protrusions have wedge-shaped portions that interlock with the insertion holes.

13. The battery pack according to claim 12, wherein the insertion holes have wedge-shaped portions that interlock with the wedge-shaped portions of the protrusions.

14. A battery pack comprising:
a bare cell comprising:
a first side, a second side, and a third side, wherein the second side and the third side face away from one another, the first side being interposed between and interconnecting the second side and the third side,
a first electrode terminal on the second side, and
a second electrode terminal on the third side;
a holder positioned over the first side of the bare cell, the holder comprising insertion holes;
a protective circuit assembly seated in the holder; and
a cover comprising a first portion, a second portion and a third portion, the first portion being interposed between and interconnecting the second portion and the third portion, wherein at least part of the protective circuit assembly is interposed between the holder and the first portion of the cover,
wherein the first portion covers the first side of the bare cell, the holder and the protective circuit assembly,
wherein the second portion at least partially covers the second side of the bare cell, wherein the third portion at least partially covers the third side of the bare cell, and
wherein the first portion further comprises insertion protrusions on an inner surface thereof, wherein the insertion holes of the holder engage with the insertion protrusions of the first portion.

15. The battery pack according to claim 14, further comprising an insulating member interposed between the bare cell and the holder, wherein the insulating member comprises:
a side portion to cover the first side of the bare cell;
an upper portion to cover the second side of the bare cell; and
a lower portion to cover the third side of the bare cell.

16. The battery pack according to claim 15, wherein the holder is attached to the first side of the bare cell, by the side portion of the insulating member.

17. The battery pack according to claim 14, wherein the holder comprises:
a seating portion disposed on the first side of the bare cell;
support portions that extend perpendicularly from the seating portion,
wherein the seating portion and the support portions define a receiving portion to receive the protective circuit assembly.

18. The battery pack according to claim 17, wherein the insertion holes are hollow cylinders that extend from the seating portion toward the cover.

19. The battery pack according to claim 18, wherein the insertion holes have narrowed openings that are smaller than the insertion protrusions.

20. The battery pack according to claim 14, wherein the insertion protrusions comprise body portions and head portions.

21. The battery pack according to claim 20, wherein the head portions are thicker than the body portions.

22. The battery pack according to claim 20, wherein the head portions have a "+"-shaped center to allow the head portions to be constricted when inserted into the openings of the holes.

23. The battery pack according to claim 1, wherein the first fastening protrusions extend through holes or grooves defined in the protective circuit assembly.

24. The battery pack according to claim 7, wherein the protrusions extend through holes or grooves defined in the protective circuit assembly.

25. The battery pack according to claim 14, wherein the insertion protrusions extend through holes or grooves defined in the protective circuit assembly.

26. The battery pack according to claim 1, wherein the first portion comprises an inner surface and an outer surface, wherein the inner surface faces the protective circuit, the holder and first side of the bare cell, wherein the outer surface faces away from the protective circuit, the holder and first side of the bare cell.

* * * * *